United States Patent Office 3,006,914
Patented Oct. 31, 1961

3,006,914
PENICILLIN COMPOSITIONS
Homer E. Stavely, Evansville, Ind., assignor to Commercial Solvents Corporation, Terre Haute, Ind., a corporation of Maryland
No Drawing. Filed June 27, 1958, Ser. No. 744,912
5 Claims. (Cl. 260—239.1)

My invention relates to therapeutically active antibiotic compounds and is more particularly concerned with novel acid stable penicillins.

The pharmaceutical industry has experienced considerable difficulty in formulating acid stable penicillins for use in orally administered therapeutic preparations. An acid labile preparation is not effective when orally administered as the penicillin molecule is quickly hydrolyzed by the gastric juices.

Penicillin is customarily produced in industry by introducing a penicillin-producing mold, such as a mold of the *Penicillium chrysogenum* and *Penicillium notatum* groups, into a medium suitable for the growth of the penicillin mold, containing a selected organic compound, called a precursor, which the mold may metabolize and incorporate, in substantial part, into the molecule of the penicillin. The industry has been handicapped by a paucity of information regarding the enzyme systems of the penicillin-producing organism and has had to conduct extensive experimentation in order to determine which precursors the organism may utilize beneficially.

I have now discovered penicillins of outstanding acid stability. My penicillins have the following structural formula:

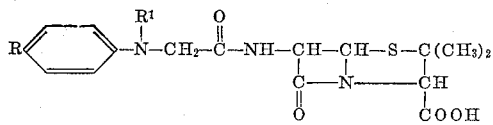

where R is selected from the group consisting of $R^2$—O—, and $(R^2)_2N$—; $R^1$ is selected from the group consisting of hydrogen and lower alkyl and $R^2$ is a lower alkyl radical.

My new penicillins are produced by introducing a compound, called a precursor, into a medium suitable for the growth of penicillin-producing organisms and fermenting the medium to produce the desired penicillin as a metabolic product of the organism. The precursors which I utilize to prepare the penicillins of my invention have the following general formula:

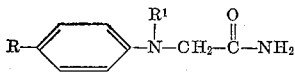

and

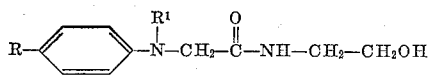

where R is selected from the group consisting of $R^2$—O—, and $(R^2)_2N$—; $R^1$ is selected from the group consisting of hydrogen and lower alkyl and $R^2$ is a lower alkyl radical.

The penicillin-producing organism may be grown under various conditions. It may be grown without agitation on the surface of a culture medium or with agitation and aeration while dispersed throughout the culture medium. The inoculated culture medium comprising ingredients; such as water, a precursor, sugars, organic salts, and one or more indeterminate compositions, such as corn steep liquor, amino acids and bran, is usually maintained within a temperature range of 20 to 30° C., 24 to 26° C., being considered optimum by the industry, during the period of fermentation, which, for maximum penicillin production, is usually four to five days.

The amount of precursor compounds employed in the culture medium may vary over a substantial range. The precursor compound may be present in the culture medium in concentrations of the order of about 1%, but it is usually desirable that smaller concentrations be employed as there is no particular advantage in employing concentrations in substantial excess of those necessary to produce the optimum effect.

After growth the mold mycelium is separated from the culture medium and from the latter, the novel penicillins are separated and purified by methods known to the art, such as absorption and extraction. The novel penicillins may then be identified by analysis, spectroscopic absorption, antibacterial tests, and other methods known to the art.

The novel penicillins are ordinarily recovered in the form of a salt, for example the potassium salt of the penicillin acid, and preferably as one of the salts ordinarily employed in the administration of the known penicillins, such as the common metal salts; for example, the alkali metal salts, including the ammonium salt, and the alkaline earth metal salts.

The following examples further illustrate my invention and it will be understood that departures therefrom may be made within the scope of the specification and claims. In general it may be said that any modifications or equivalents that would ordinarily occur to those skilled in the art are to be considered as lying within the scope of my invention.

*Example I*

In order to prepare the potassium salt of p-methoxyanilinomethyl penicillin, 200 cc. portions of culture medium having the following composition

| | | |
|---|---|---|
| Lactose | grams | 125 |
| Corn steep solids | do | 100 |
| Calcium carbonate | do | 10 |
| p-Methoxyanilinoacetamide | do | 0.85 |
| Water | ccs | 5000 | are placed in 1 liter flasks, sterilized, and inoculated with a spore suspension of the organism *Penicillium chrysogenum*, W49–133. The flasks are maintained at a temperature of about 23–26° C. and shaken constantly for five days. The pH is adjusted to 7.5 and the medium filtered to remove the mold mycelium. The pH is then adjusted to 5.0 or below with 85% phosphoric acid and the beer is extracted with three 500 cc. portions of wet n-butyl acetate. The combined acetate extracts are extracted with 150 cc. of an aqueous 33% solution of potassium pyrophosphate. The phosphate extract is then re-extracted with 250 ml. portions of n-butanol. The n-butanol extract is distilled to remove the remaining water and to crystallize the p-methoxyanilinomethyl penicillin which is then dried.

*Example II*

The potassium salt of p-methoxyanilinomethyl penicillin can also be prepared as follows: A culture medium is prepared as in Example I and is placed in a five-gallon container equipped with a stirrer and an air inlet tube fitted with an air filter.

The culture medium is sterilized and inoculated with a spore suspension of penicillin mold, *Penicillium chrysogenum*, W49–133. The fermenting medium is maintained at a temperature of about 23–26° C. and continuously stirred for five days. Throughout the incubation period, air is continually passed into the medium through the air inlet tube. After incubation, the mold mycelium is removed from the aqueous broth by filtration and the filtrate treated as in Example I to isolate and purify the p-methoxyanilinomethylpenicillin. The potassium salt of the p-methoxyanilinomethylpenicillin thus prepared is the same as that prepared by the procedure of Example I.

*Example III*

Using the procedures of Example I, the penicillins listed below can be prepared by substituting 0.85 gram of the named precursor for the p-methoxyanilino acetamide in the medium of Example I.

| Penicillin Formed | Precursor |
|---|---|
| p-Ethoxyanilinomethylpenicillin | 2-(p-ethoxyanilino)-acetamide. |
| N-methylanilinomethylpenicillin | 2-(N-methylanilino)-acetamide. |
| N-ethylanilinomethylpenicillin | N-(2-hydroxyethyl)-2-(N-methylanilino)-acetamide. |
| p-Dimethylaminoanilinomethylpenicillin | 2-(p-dimethylamino-anilino)-acetamide. |
| p-Diethylaminoanilinomethylpenicillin | N-(2-hydroxyethyl)-2-(p-dimethylaminoanilino)-acetamide. |

*Example IV*

The new penicillins obtained in the form of potassium salts may be converted to other salts in a number of ways. One way is as follows: An aqueous solution of the potassium salt, acidified to pH less than 5.0, is extracted with an equal volume of an organic solvent, such as amylacetate, ether, chloroform, or the like. The organic solvent solution, containing the new penicillin in acid form, is extracted with an aqueous solution containing the cation of the desired salt, for example, a solution of sodium hydroxide, calcium phosphate, ammonium hydroxide, or the like, at a pH of 8.5. The aqueous extract contains a penicillin as the corresponding salt, for example, sodium salt, the calcium salt, or the ammonium salt of the penicillin. The salt is suitably recovered from the solution by drying in vacuo, from the frozen state.

This application is a continuation-in-part of my U.S. Serial No. 635,954, filed January 24, 1957, now abandoned.

Now having described my invention what I claim is:
1. p-Dimethylaminoanilinomethylpenicillin.
2. p-Methoxyanilinomethylpenicillin.
3. N-ethylanilinomethylpenicillin.
4. p-Diethylaminoanilinomethylpenicillin.
5. A penicillin composition having the following formula:

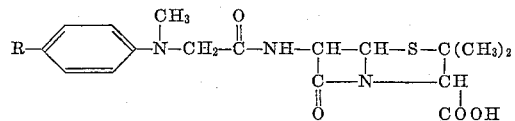

where R is selected from the group consisting of $(R^1)_2N-$ and $R^1-O-$ and $R^1$ is selected from the group consisting of methyl and ethyl.

References Cited in the file of this patent
UNITED STATES PATENTS

| | | |
|---|---|---|
| 2,479,296 | Behrens | Aug. 16, 1949 |
| 2,562,408 | Behrens | July 31, 1951 |

OTHER REFERENCES

Clarke: Chemistry of Penicillin, page 675 (1949), Princeton Uni. Press.
Clarke: Chemistry of Penicillin, page 677 (1949).
Medicinal Chemistry, vol. II, pages 879–880 (1951).